(12) United States Patent
Wynick et al.

(10) Patent No.: US 11,313,728 B2
(45) Date of Patent: Apr. 26, 2022

(54) TEMPERATURE SENSING SYSTEM

(71) Applicant: SoCal Dab Tools, LLC, Boca Raton, FL (US)

(72) Inventors: Daniel Wynick, Boca Raton, FL (US); Bryan Berc, North Hollywood, CA (US); Cody Johnson, Corona, CA (US); John Lichtbach, Whittier, CA (US); Andrew Habedank, Washington, MI (US); Samuel L. Morris, III, Buffalo, NY (US)

(73) Assignees: SoCal Dab Tools LLC, Boca, FL (US); Samuel Morris, Buffalo, NY (US)

( * ) Notice: Subject to any disclaimer, the term of this patent is extended or adjusted under 35 U.S.C. 154(b) by 0 days.

(21) Appl. No.: 17/532,386

(22) Filed: Nov. 22, 2021

(65) Prior Publication Data
US 2022/0082442 A1    Mar. 17, 2022

Related U.S. Application Data

(63) Continuation of application No. 17/135,323, filed on Dec. 28, 2020, now Pat. No. 11,187,586.
(Continued)

(51) Int. Cl.
*G01J 5/00*    (2022.01)
*G01J 5/02*    (2022.01)
*G01J 5/10*    (2006.01)

(52) U.S. Cl.
CPC ............ *G01J 5/026* (2013.01); *G01J 5/0014* (2013.01); *G01J 5/10* (2013.01)

(58) Field of Classification Search
CPC .. G01J 5/026; G01J 5/0014; G01J 5/10; G01J 5/25
See application file for complete search history.

(56) References Cited

U.S. PATENT DOCUMENTS 2,947,171 A    8/1960   Peltola
3,651,694 A *  3/1972   Lamb .................. A61B 5/01
                                          374/170
(Continued)

FOREIGN PATENT DOCUMENTS

CN    205643218         10/2016
CN    106239560 A  *   12/2016
(Continued)

OTHER PUBLICATIONS

PCT/US2021/012142. International Search Report and Written Opinion dated Mar. 23, 2021. 39 pages.
(Continued)

*Primary Examiner* — Gail Kaplan Verbitsky
(74) *Attorney, Agent, or Firm* — Jeffrey G. Sheldon; Cislo & Thomas LLP

(57) ABSTRACT

A temperature sensing device comprising a housing including a display, an extension at least 1.5 inches long extending from the housing, a temperature sensor, and a connector from the sensor to the housing for transmitting the output to the housing. The extension has a proximal section at the housing and an opposed distal section, the distal section being movable relative to the housing. The temperature sensor is at the distal section of the extension for sensing the temperature of a target material and providing an output related to the temperature of the target material. Optionally, the device includes a thermal insulator at the distal section of the extension protecting the temperature sensor from heat from the target material. Optionally, the device includes a light source at the distal section of the extension for aiming the sensor at the target material.

27 Claims, 12 Drawing Sheets

Related U.S. Application Data

(60) Provisional application No. 63/066,624, filed on Aug. 17, 2020.

(56) References Cited

U.S. PATENT DOCUMENTS

| | | | |
|---|---|---|---|
| 4,901,061 A | 2/1990 | Twerdochlib | |
| 4,984,904 A | 1/1991 | Nakano et al. | |
| 5,165,235 A | 11/1992 | Nitschke | |
| 5,406,939 A | 4/1995 | Bala | |
| 5,653,239 A * | 8/1997 | Pompei | G01J 5/04 600/549 |
| 6,001,066 A * | 12/1999 | Canfield | G01J 5/0025 374/E13.003 |
| 6,286,992 B1 * | 9/2001 | Kyrtsos | B61K 9/06 374/45 |
| 6,591,103 B1 | 7/2003 | Dunn et al. | |
| 6,771,373 B2 | 8/2004 | Schenkl et al. | |
| 6,837,616 B2 | 1/2005 | Ignatowicz | |
| 7,364,355 B2 | 4/2008 | Ignatowicz | |
| 7,520,668 B2 | 4/2009 | Chen | |
| 8,834,019 B2 | 9/2014 | Franden | |
| 2003/0007544 A1 | 1/2003 | Chang et al. | |
| 2004/0013164 A1 * | 1/2004 | Li | G01K 3/005 374/208 |
| 2004/0141543 A1 * | 7/2004 | Jensen | A61B 1/227 374/142 |
| 2005/0018744 A1 | 1/2005 | Schonlein et al. | |
| 2005/0025213 A1 | 2/2005 | Parks | |
| 2005/0111520 A1 | 5/2005 | Ignatowicz | |
| 2005/0229611 A1 * | 10/2005 | Welch | G01K 5/08 374/E5.01 |
| 2006/0026971 A1 * | 2/2006 | Sharpe | G01K 13/00 62/126 |
| 2008/0080593 A1 | 4/2008 | Lane et al. | |
| 2008/0175301 A1 | 7/2008 | Chen | |
| 2012/0152246 A1 | 6/2012 | Yomtov | |
| 2015/0036719 A1 | 2/2015 | Koduri | |
| 2016/0061807 A1 * | 3/2016 | Ravishankar | G01N 33/497 250/338.5 |
| 2016/0116348 A1 * | 4/2016 | Lee | G01J 5/046 374/152 |
| 2016/0161420 A1 | 6/2016 | Zhu et al. | |
| 2017/0052070 A1 | 2/2017 | Marsh et al. | |
| 2017/0329125 A1 | 11/2017 | Churovich | |
| 2018/0077967 A1 | 3/2018 | Hatton et al. | |
| 2018/0110938 A1 | 4/2018 | Trzecieski | |
| 2018/0321622 A1 | 11/2018 | Yoshimura | |
| 2019/0195616 A1 * | 6/2019 | Cao | G06T 1/0014 |
| 2020/0000143 A1 | 1/2020 | Anderson et al. | |
| 2020/0053259 A1 | 2/2020 | Muecki et al. | |
| 2020/0146361 A1 * | 5/2020 | Silver | A61M 11/042 |
| 2020/0238027 A1 | 7/2020 | Raichman | |
| 2020/0269267 A1 | 8/2020 | Bessant et al. | |
| 2020/0323791 A1 | 10/2020 | Santos et al. | |
| 2020/0330706 A1 | 10/2020 | Greenfield | |
| 2020/0368379 A1 | 11/2020 | Agarwal | |
| 2021/0069756 A1 | 3/2021 | Lukac et al. | |
| 2021/0108967 A1 * | 4/2021 | Thrash | G01J 5/0205 |
| 2021/0116304 A1 * | 4/2021 | Wynick | G01J 5/0896 |

FOREIGN PATENT DOCUMENTS

| | | | | |
|---|---|---|---|---|
| JP | S62101334 U | * | 6/1987 | |
| JP | 2002315738 A | * | 10/2002 | |
| JP | 4862647 | | 1/2012 | |
| WO | WO-9425841 A1 | * | 11/1994 | A61B 5/0008 |
| WO | WO2019226052 | | 11/2019 | |

OTHER PUBLICATIONS

Non-contact Flexible Infrared Thermometer with Laser up to 1112° F., 600° C. 8:1 D/S Ratio NEW SKU: MTRIR68-001. Ruby Electronics. http://ruby-electronics.com/store_item/Non-contact_Flexible_Infrared_Thermometer_with_Laser_up_to_1112_deg_F_600_deg_C_8_to_1_DS_Ratio_NEW Published at least as early as May 20, 2006.

ODT Pocket Temper V2 by Official DabTray—IR dab thermometer, dab timer, dab station, dab tray. Etsy. Published Apr. 2020. https://www.etsy.com/listing/878377095/odt-pocket-temper-v2-by-official-dabtray?ref=shop_home_active_1&crt=1.

* cited by examiner

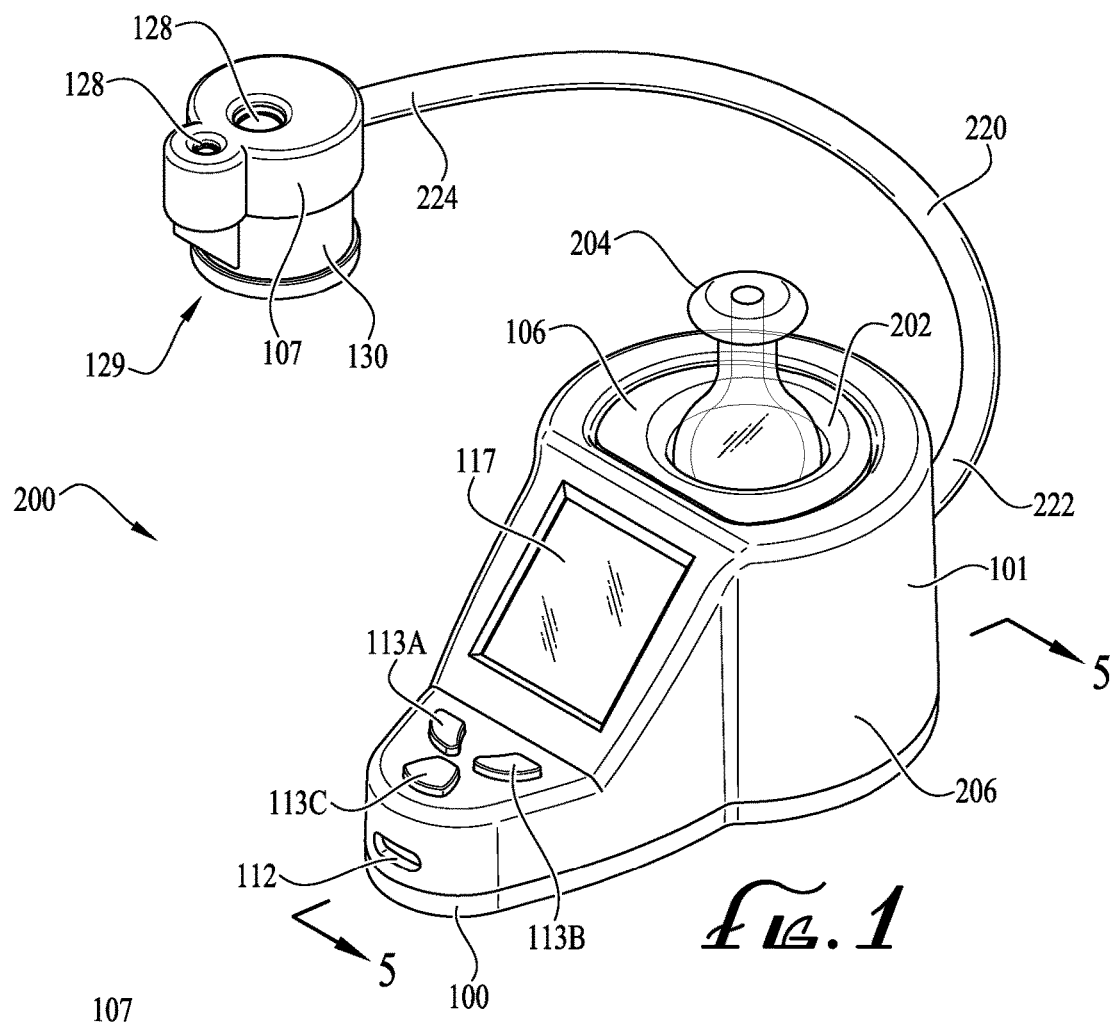
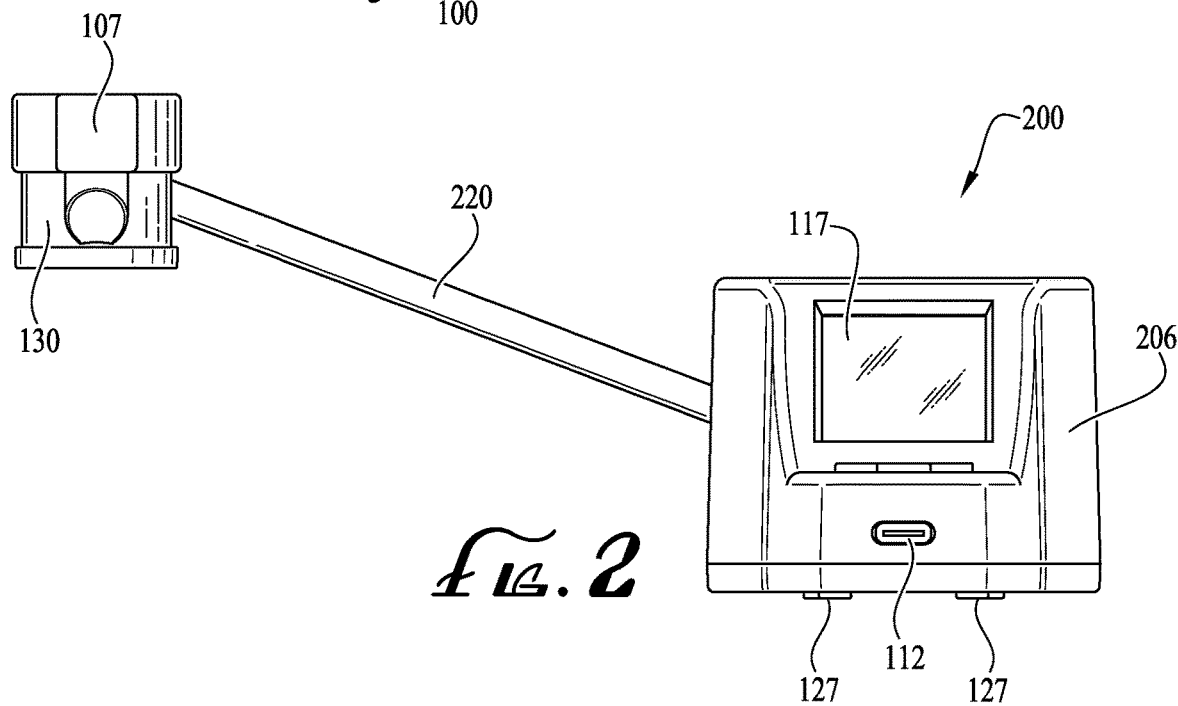

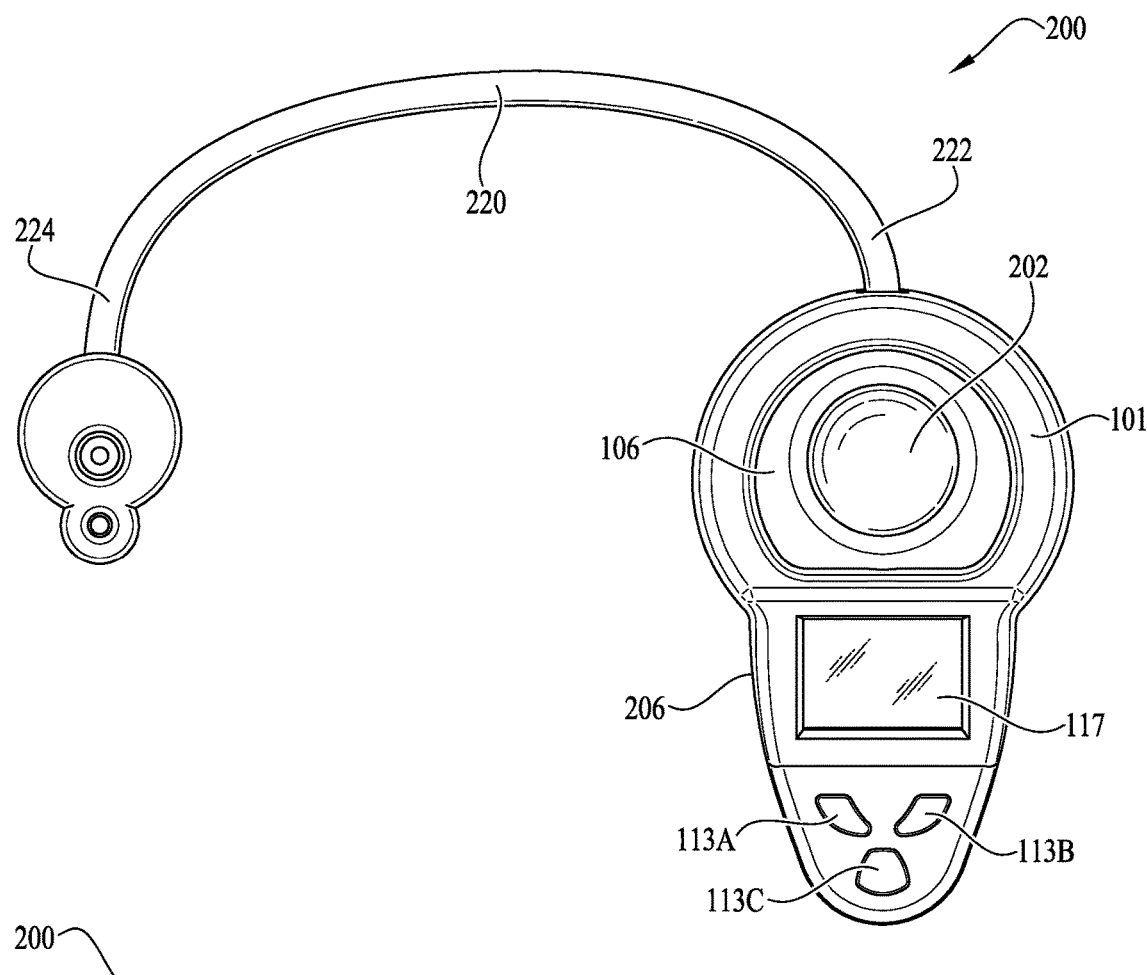
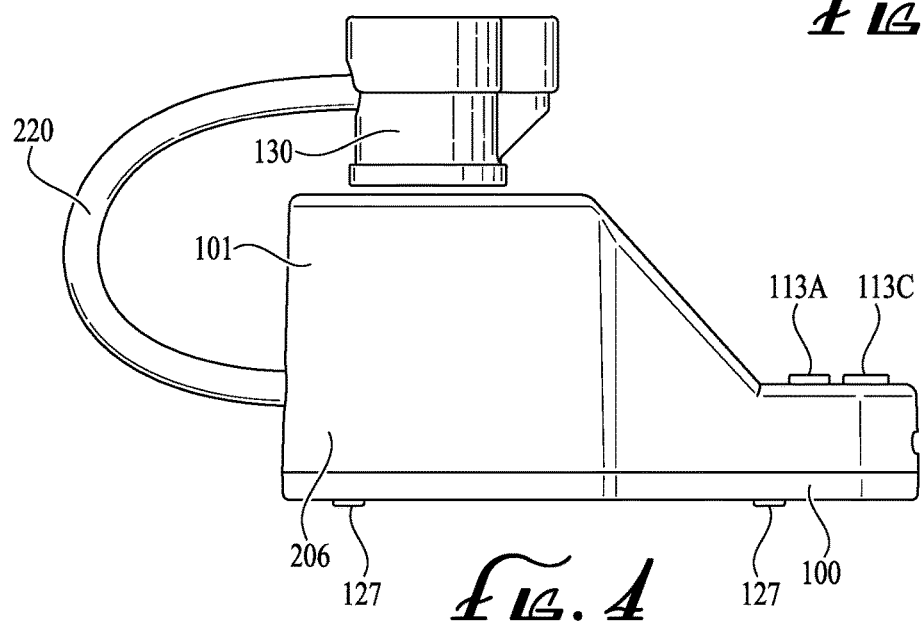

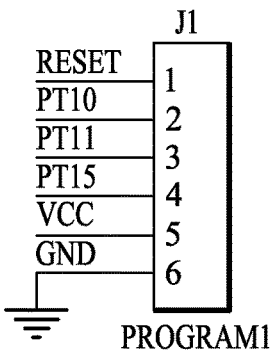
FIG. 10G
PT13 (FRRXD)  R10  300  PTXD
PT14 (FRTXD)  R11  300  PRXD
FIG. 10F
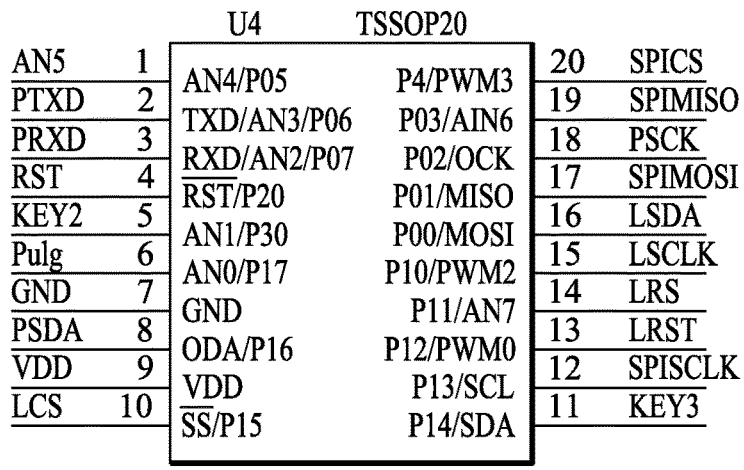
FIG. 10H
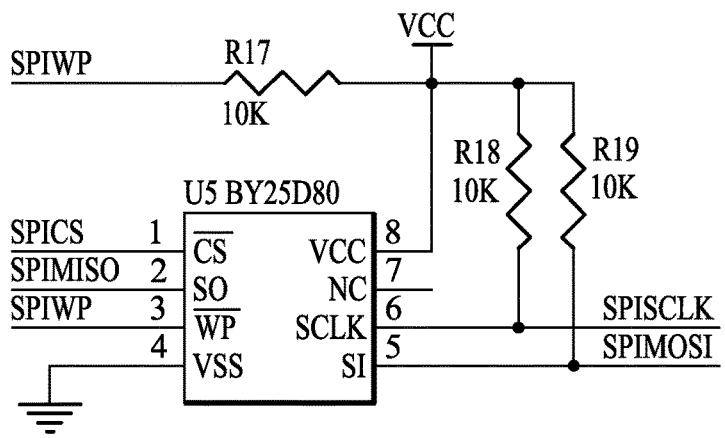
FIG. 10I
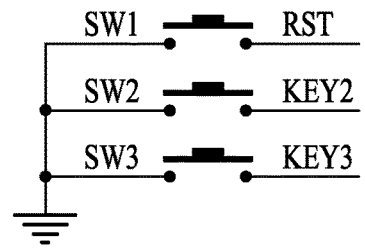
FIG. 10J

TEMPERATURE SENSING SYSTEM

CROSS-REFERENCE TO RELATED APPLICATIONS

This application is a continuation and claims benefit to U.S. Utility patent application Ser. No. 17/135,323, titled, "Temperature Sensing System", filed Dec. 28, 2020, which claims the benefit of U.S. Provisional Patent Application Ser. No. 63/066,624, titled "Temperature Sensing System," filed Aug. 20, 2020, the contents of which are incorporated by reference in their entirety.

BACKGROUND

In many systems, it is important to accurately measure the temperature of a target material. For example, a system for vaporizing such materials as botanical extracts includes a receptacle, commonly referred to as a banger, for holding the botanical extracts while it is vaporized such as with a butane torch. If the target material is under heated, inadequate vaporization can occur. If it is overheated, burning can occur.

Accordingly, there is a need for a temperature sensing device that accurately measures the temperature of a heated targeted material.

SUMMARY

The invention is directed to a temperature sensing device having a housing that includes a display, and an extension extending from the housing by at least 1.5 inches. The extension has a proximal section at the housing and an opposed distal section, the distal section being movable relative to the housing so that it can be brought near an appropriate location proximate to the target material. A temperature sensor is at the distal section of the extension for sensing the temperature of a target material. The target material can provide a vapor when heated to a selected temperature. The temperature sensor provides an output related to the temperature of the target material. There is a connector from the sensor to the housing for transmitting the output of the temperature sensor to the housing for display.

The device can have a light source at the distal section of the extension for aiming the sensor at the target material.

Optionally, the device has a thermal insulator at the distal section of the extension for protecting the temperature sensor fro a heat from the target material. The thermal insulator can have a first hole in the thermal insulator so that the temperature sensor is not covered by the thermal insulator. Optionally, the thermal insulator can have a second hole in the thermal insulator so that the light source is not covered by the thermal insulator.

The display can show the temperature sensed by the temperature sensor.

The device can further comprise a conversion circuit in the housing for converting the output of the temperature sensor to the displayed temperature.

The housing can have a selector key for inputting to the conversion circuitry the container material constituted by a container containing the target material for adjusting the displayed temperature based on the infrared transmissivity of the container material.

The housing can also have an input key for setting a target temperature of the target material and an alert generator for generating an alert when the target temperature is sensed by the temperature sensor.

The housing can also have a selector key for the type of material of a container containing the target material.

The housing can comprise a recess for receiving a banger cap.

The extension can be a flexible tube with the connector therein. Optionally, the extension is removable. Optionally, the device further comprises a replacement extension for changing out the removable extension.

Optionally, the device has memory for tracking the number of times the device has sensed the target temperature, and optionally, for storing how much time it takes to reach the target temperature.

The device can be used by the steps of:
a) placing the target material into a container that is translucent or transparent;
b) heating the target material to a temperature that generates a vapor from the target material; and
c) detecting the temperature of the target material with the device by moving the extension relative to the housing to a location proximate to the container.

The target material can be cannabis and the step of heating can comprise heating the cannabis to a temperature between 230 and 330 degrees Centigrade.

When the device has a light source generating a light beam at the distal section of the extension for aiming the sensor at the target material, the method can comprise aiming the beam generated at the target material.

DRAWINGS

These and other features, aspects, and advantages of the present invention will become better understood with reference to the following description, and the accompanying drawings and attachments where:

FIG. 1 is a perspective view of a temperature sensing device according to the present invention, with a banger held in a receiving recess of the device;

FIG. 2 is a front elevation view of the device of FIG. 1;

FIG. 3 is a top plan view of the device of FIG. 1;

FIG. 4 is a left side elevation view of the device of FIG. 1;

Figure 10A:
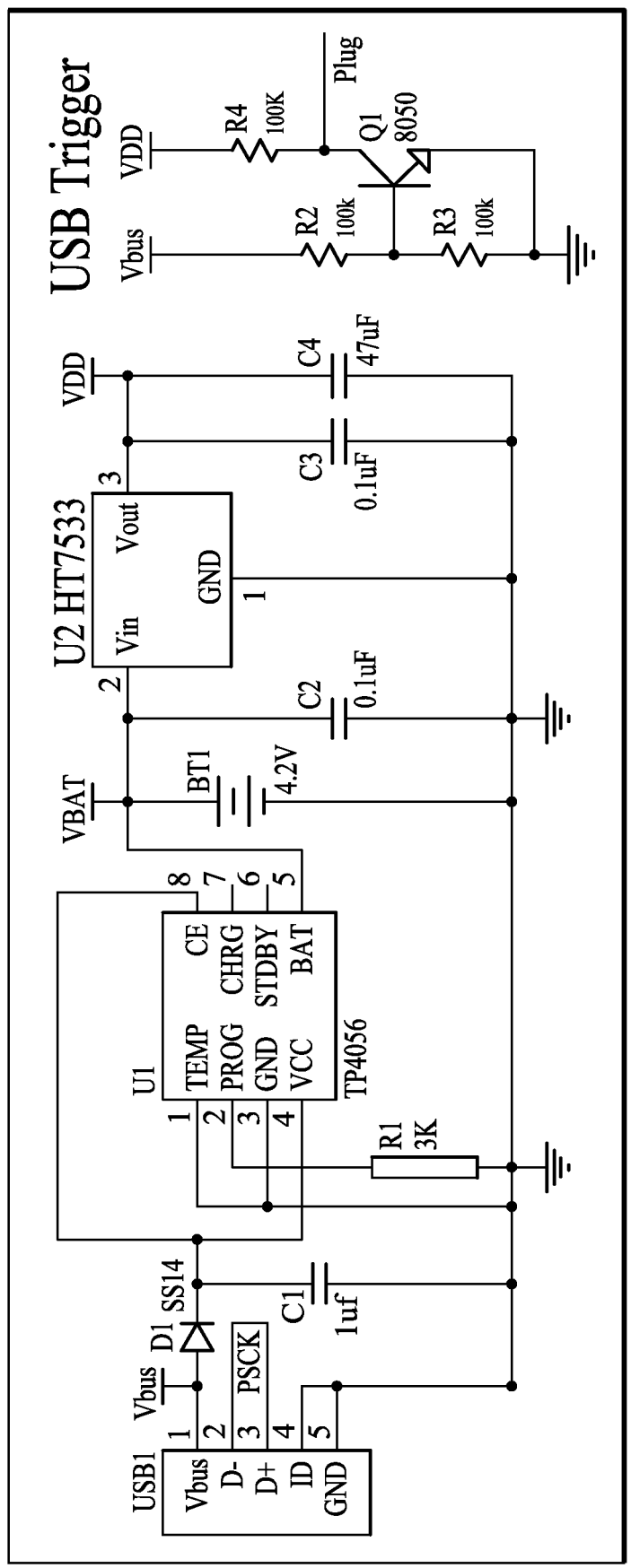
Figure 10B:
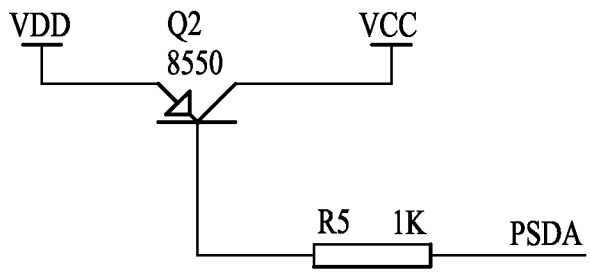
Figure 10C:
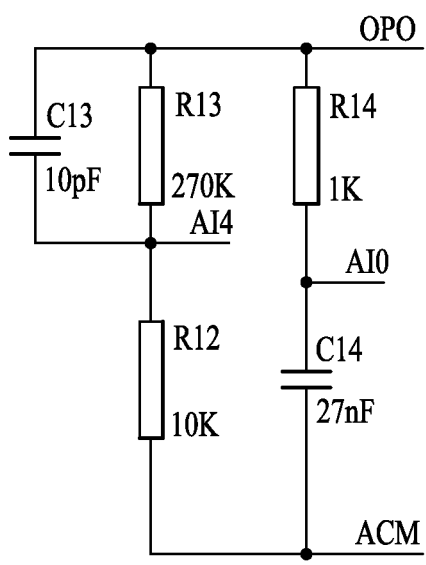
Figure 10D:
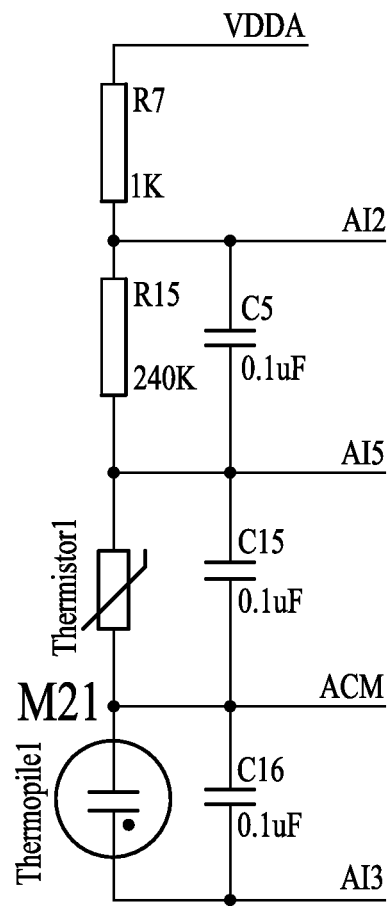
Figure 10E:
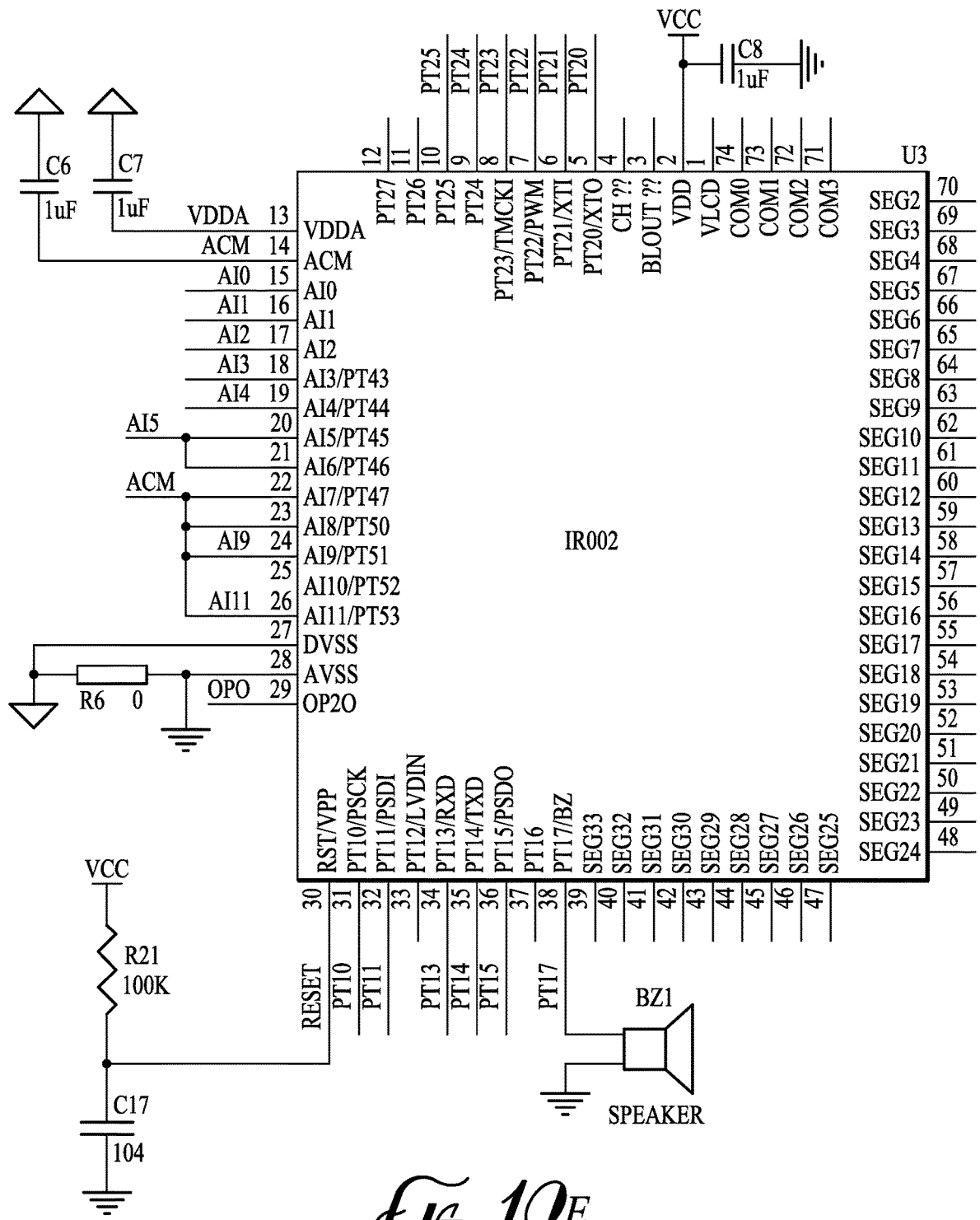
Figure 10K:
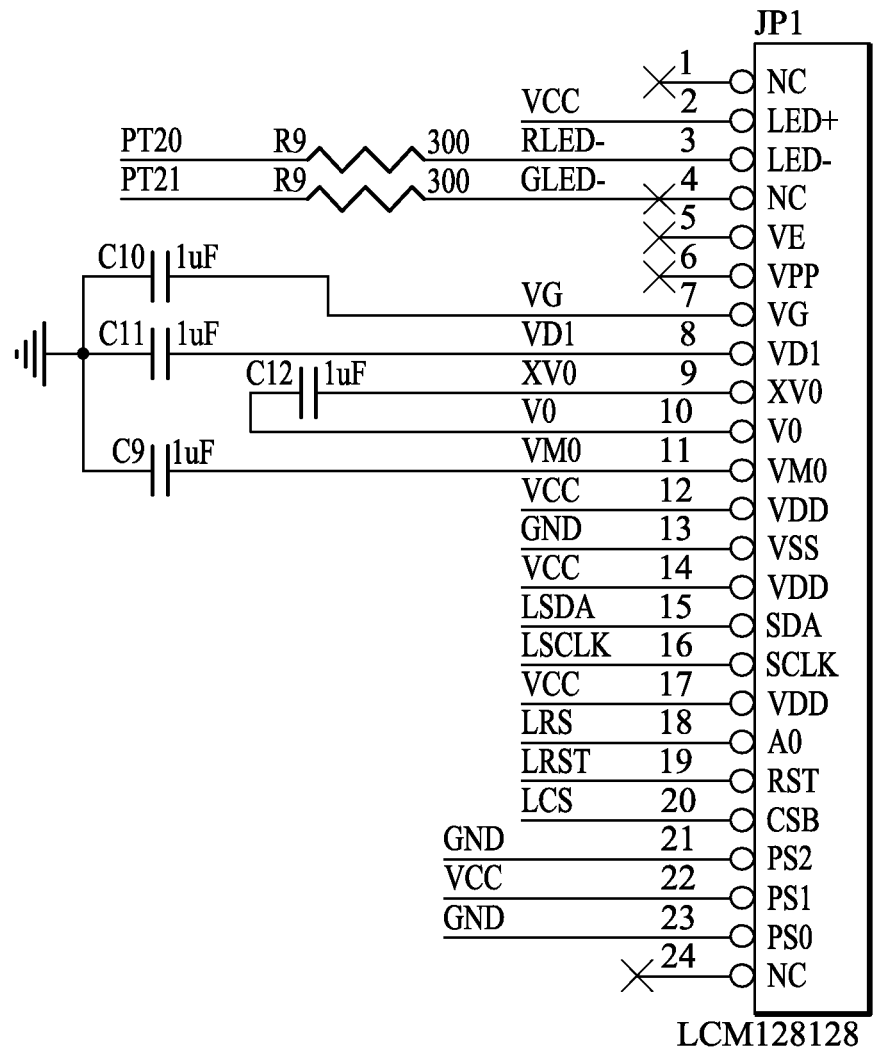
Figures 10L, 10M:
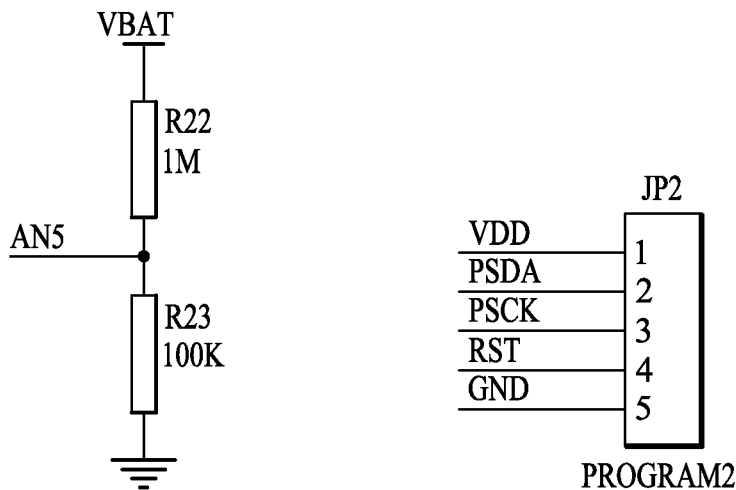
Figure 11:
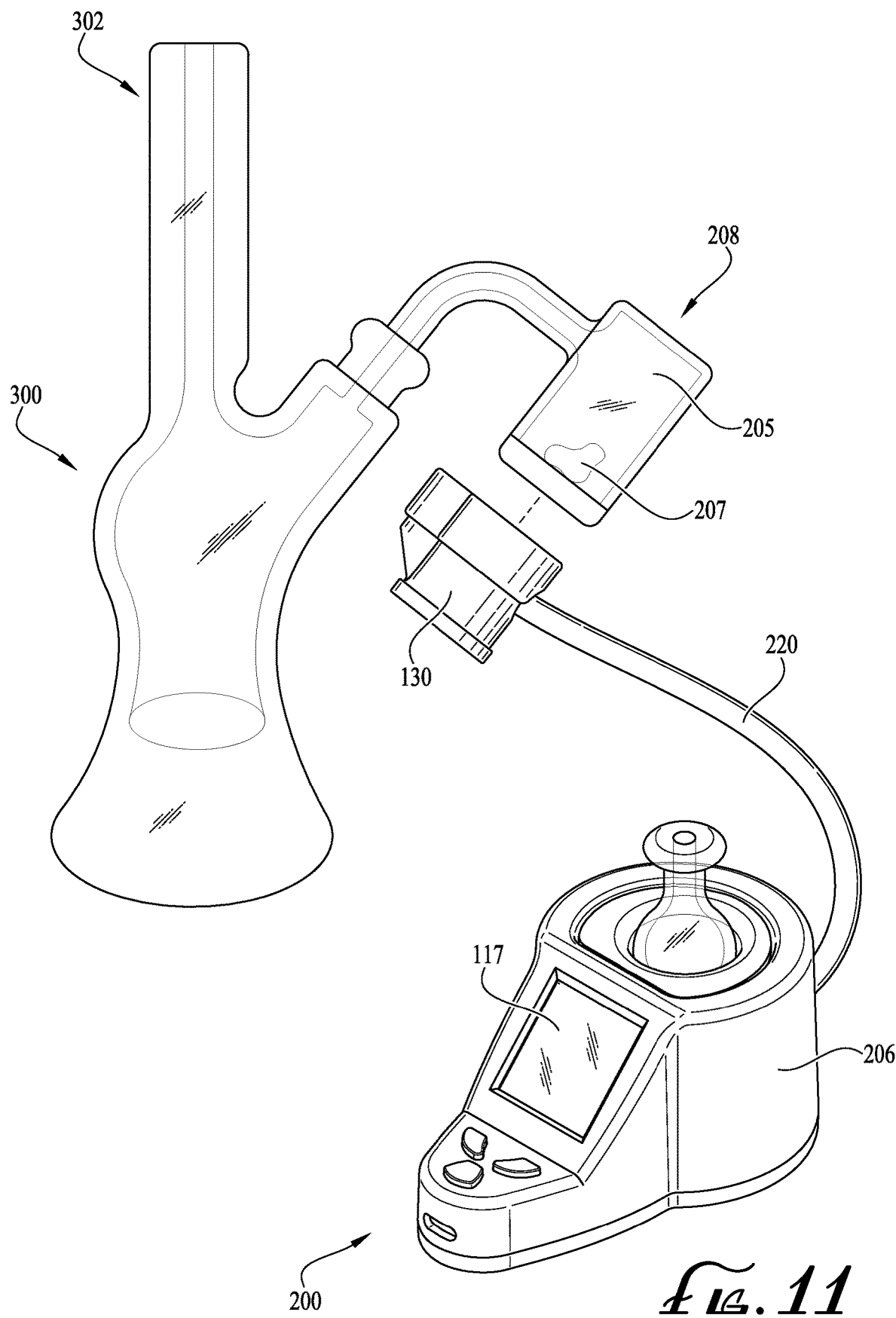

FIGS. 10A-10M schematically show circuit diagrams for the circuits used in the device of FIG. 1; and FIG. 11 is a perspective view of use of the device of FIG. 1 with a vaporizing rig.

DESCRIPTION

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," do not exclude other components or steps.

With reference to FIGS. 1-8, a temperature sensing device 200 having features of the present invention is shown. The temperature sensing device 200 includes a recess 202 for receiving a banger cap 204. A banger cap 204 is a dabbing accessory that restricts airflow and traps heat around domeless nails or bangers 205, allowing cannabis, such as a cannabis concentrate 207, to vaporize at a lower temperature, preserving the quality and flavor of the concentrate. With reference to FIG. 11, use of the temperature sensing device 200 is shown relative to a standard vaporizing rig 300 having a container (banger) 205 for holding target material 207 to be heated. The banger cap 204 is placed on the banger (container) 205 when a user is inhaling vapor from the heated target material 207 and helps regulate airflow into the device 200.

Figure 8:
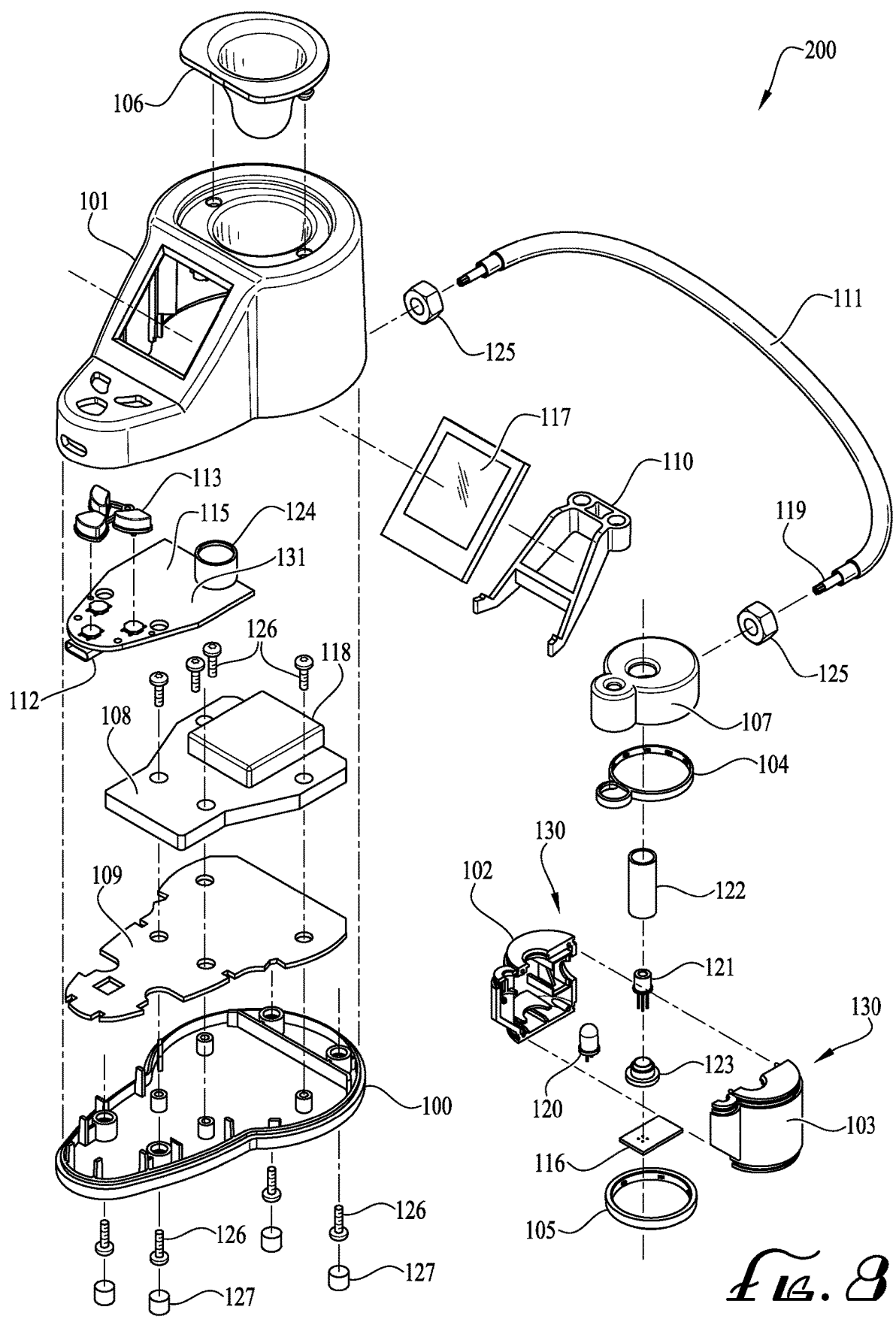
FIG. 8 is an exploded view showing the components of the device of FIG. 1.

Table 1, principally with regard to FIG. 8, presents the components of the device 200:

TABLE 1

| ITEM NO. | QTY. | DESCRIPTION |
| --- | --- | --- |
| 100 | 1 | HOUSING BASE |
| 101 | 1 | HOUSING COVER |
| 102 | 1 | SENSOR BARREL LEFT |
| 103 | 1 | SENSOR BARREL RIGHT |
| 104 | 1 | BARREL CAP TOP |
| 105 | 1 | BARREL CAP BOTTOM |
| 106 | 1 | SILICONE INSERT |
| 107 | 1 | SILICONE BARREL COVER |
| 108 | 1 | BASE WEIGHT |
| 109 | 1 | PCB WITH A WEIGHT BRACKET |
| 110 | 1 | DISPLAY BRACKET |
| 111 | 1 | BARREL FLEXLINE |
| 112 | 1 | USB PORT |
| 113 | 1 | USER BUTTONS |
| 114 | 3 | PCB CONTACTS FOR BUTTONS |
| 115 | 1 | MAIN PCB (printed circuit board) |
| 116 | 1 | SENSOR PCB (printed circuit board) |
| 117 | 1 | OLED DISPLAY |
| 118 | 1 | BATTERY |
| 119 | 1 | CABLE FROM PCB TO SENSOR |
| 120 | 1 | BARREL LED |
| 121 | 1 | TEMPERATURE SENSOR |
| 122 | 1 | SENSOR TUBE |
| 123 | 1 | SENSOR COLLAR |
| 124 | 1 | PCB MOUNT SPEAKER |
| 125 | 2 | LOCKING NUT |
| 126 | 8 | TORX SELF TAPPING SCREWS |
| 127 | 4 | ANTI SKID FOOT |
| 128 | 2 | HOLES IN INSULATING COVER |
| 129 | 1 | SENSOR ASSEMBLY |
| 130 | 1 | SENSOR BARREL |
| 131 | 1 | MICROPROCESSOR |

The device 200 comprises a housing 206 formed of a housing base 100 and a housing cover 101 with a base weight 108 held in place by a weight bracket combined with a printed circuit board (PCB) 109 so the housing stays in position during use. The bottom of the housing base 100 has antiskid feet 127. The housing cover 101 has an opening for an OLED (organic light emitting diode) display 117 held in place by a bracket 110. The display 117 displays information from the device 200, including but not limited to battery level, a light alert indicator, a sound alert indicator, an LED guide indicator, temperature reading and degree scale information, and banger type. The LED guide indicator assists the user in aligning the sensor 121 with the banger 205.

The printed circuit board 109 controls the main functions of the device 200, creates the output from a sensor 121 and alerts the sound and lights to flash and ding upon set parameters. Also, within the housing 206 is a circuit board 115 that houses a microprocessor 131 for running the functions of the entire system. The housing 206 includes a PCB mount speaker 124 for sounding the sound alerts.

Figure 9:
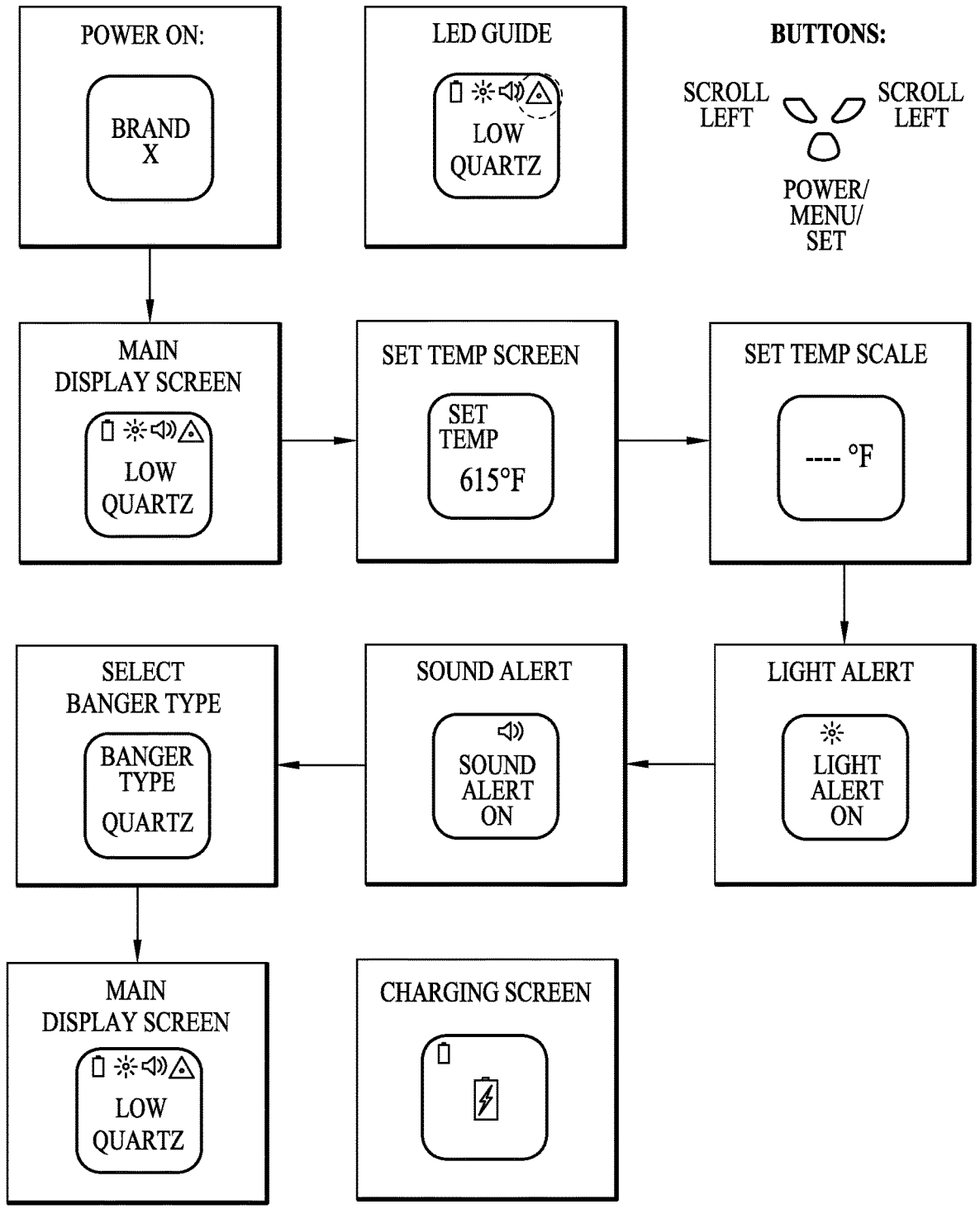
FIG. 9 is a flow chart showing the programing by a user of the device of FIG. 1.

Contacts 114 are provided for the user buttons 113 to provide signals to the main printed circuit board 115. User button 113 project upward through the housing cover 101. Preferably, there are three user buttons 113, as best seen in FIG. 9. The two upper buttons 113A, 113E permit the user to scroll left and right through the menu. The bottom, centrally located button 113C is the power/menu/set button. The user buttons 113 can be made from rigid or flexible plastic material or metal.

The housing cover 101 also includes a USB port 112 and a battery 118 such as a rechargeable lithium battery. The battery 18 can be charged using the USB port 112. Optionally the device 200 can be provided with a socket for external power or in place of or as an option to the battery 118. Components of the housing 206 are held together with Torx (trademark) tapping screws 126; however, other types of fasteners known in the art may be used.

The device 200 includes a temperature sensor 121, namely an infrared sensor. The appropriate temperature sensor depends on the application for which the device is used. For example, if used for heating cannabis, the temperature sensor 121 preferably is effective between 230 C-330 degrees C. and a preferred sensor range is 93-425 degrees C.

A preferred temperature sensor 121 is a Heimann thermopile sensor. The Heimann thermopile sensor is preferred because it comprises a CMOS compatible sensor chip plus a thermistor reference chip, good sensitivity, a small temperature coefficient of sensitivity, and high reproducibility and reliability.

The sensor 121 has a storage temperature (meaning the temperature at which the sensor 121 can safely be stored at) of between −40 degrees C. to 100 degrees C., and an operating temperature (meaning the temperature at which the sensor 121 can safely operate at) of between −20 degrees C. to 100 degrees C. Table 2 outlines the general and electrical parameters of the Heimann thermopile sensor 121:

TABLE 2

| Parameter | Symbol | Limits | | | Units | Conditions |
| --- | --- | --- | --- | --- | --- | --- |
| | | Min | Typ. | Max | | |
| element size | | | 1.2*1.2 | | mm$^2$ | absorbing area |
| field of view (FOV) | | | 16° @ 50% | | degree | Full FOV vs indicated Sv level |
| | | | 30° @ 10% | | | Diagonal cut |
| | | | 34° @ 5% | | | Tested with point source |
| resistance | $R_{TP}$ | 69 | 84 | 112 | kΩ | −40° C. to 100° C. |
| signal voltage | $V_s$ | | 890 | | μV | $T_{amb}$ = 25° C., $T_{BB}$ = 100° C., 4.5 Hz, distance 15 mm |

TABLE 2-continued

| Parameter | Symbol | Limits | | | Units | Conditions |
|---|---|---|---|---|---|---|
| | | Min | Typ. | Max | | |
| time constant | $\tau$ | | 10 | 13 | ms | |
| noise voltage | $V_{RMS}$ | | 37 | | nV/√Hz | r.m.s., 25° C. |
| pin insulation resistance | $R_{ISO}$ | 30 | | | GΩ | 25° C., 50% RH, 11 V, DC |

Tables 3A and 39 outline the general and electrical parameters of the thermistor of the thermopile Heimann sensor 121:

TABLE 3A

| | | Type | | | |
|---|---|---|---|---|---|
| | | Thermistor 100 kΩ | | | |
| Parameter | Symbol | Limits | | | Conditions |
| | | Min. | Typ. | Max Units | |
| resistance | $R_{TH}$ | 95 | 100 | 105 kΩ | 25° C. |
| BETA-value | β | 3900 | 3940 | 3980 K | 25° C./50° C. |

TABLE 3B

| T/° C. | Rth_min/Ohm | Rth_nom/Ohm | Rth_max/Ohm |
|---|---|---|---|
| −30 | 1557900 | 1655000 | 1753100 |
| −25 | 1163320 | 1234000 | 1306680 |
| −20 | 875826 | 928700 | 981974 |
| −15 | 665010 | 704500 | 744190 |
| −10 | 508730 | 538500 | 568370 |
| −5 | 392108 | 414600 | 437292 |
| 0 | 304466 | 321700 | 338934 |
| 5 | 238072 | 251400 | 264728 |
| 10 | 187444 | 197800 | 208056 |
| 15 | 148568 | 156600 | 164632 |
| 20 | 118404 | 124800 | 131096 |
| 25 | 95000 | 100000 | 105000 |
| 30 | 76537 | 80630 | 84713 |
| 35 | 62032 | 65380 | 68738 |
| 40 | 50543 | 53310 | 56077 |
| 45 | 41386 | 43680 | 45984 |
| 50 | 34070 | 35980 | 37890 |
| 55 | 28174 | 29770 | 31366 |
| 60 | 23405 | 24750 | 26095 |
| 65 | 19536 | 20670 | 21804 |
| 70 | 16383 | 17340 | 18297 |
| 75 | 13788 | 14600 | 15422 |
| 80 | 11653 | 12350 | 13047 |
| 85 | 9890 | 10480 | 11080 |
| 90 | 8421 | 8930 | 9444 |
| 95 | 7197 | 7635 | 8076 |
| 100 | 6172 | 6551 | 6935 |

Table 4 outlines the filter coating characteristic and lens parameters of the thermopile Heimann sensor 121:

TABLE 4

| | Filter F5.5 | | | | |
|---|---|---|---|---|---|
| Parameter | Limits | | | Units | Conditions |
| | min | Typ | Max | | |
| average transmission | 75 | | | % | 7.5 μm to 13.5 μm |
| absolute transmission | | | 1 | % | visual to 5 μm |
| cut on at 5% | 5.2 | 5.5 | 5.8 | μm | 25° C. |
| back focal length of lens | | 3.0 | | mm | |

Figure 5:
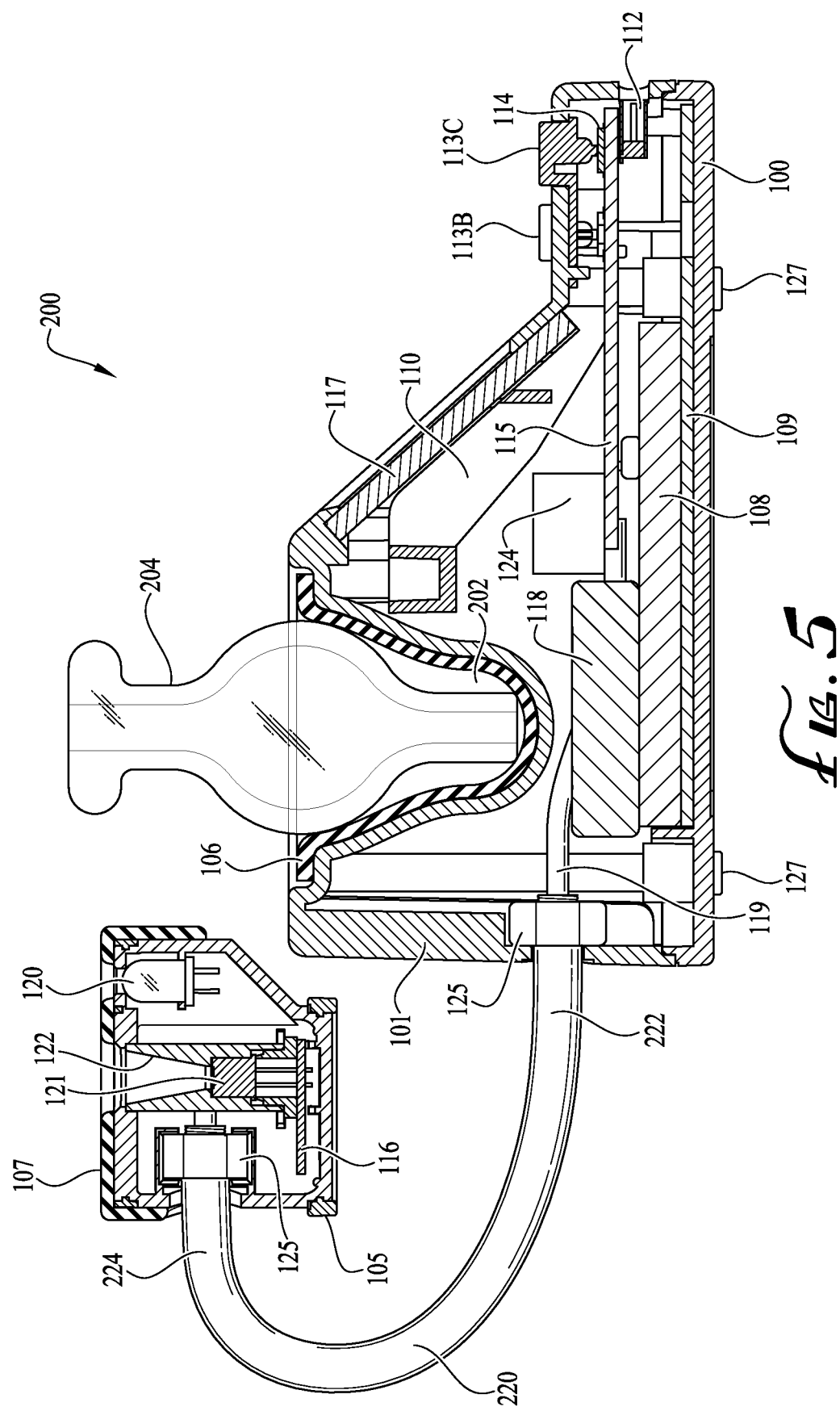
FIG. 5 is a sectional view of the device of FIG. 1 taken along line 5-5 of FIG. 1.
Figure 6:
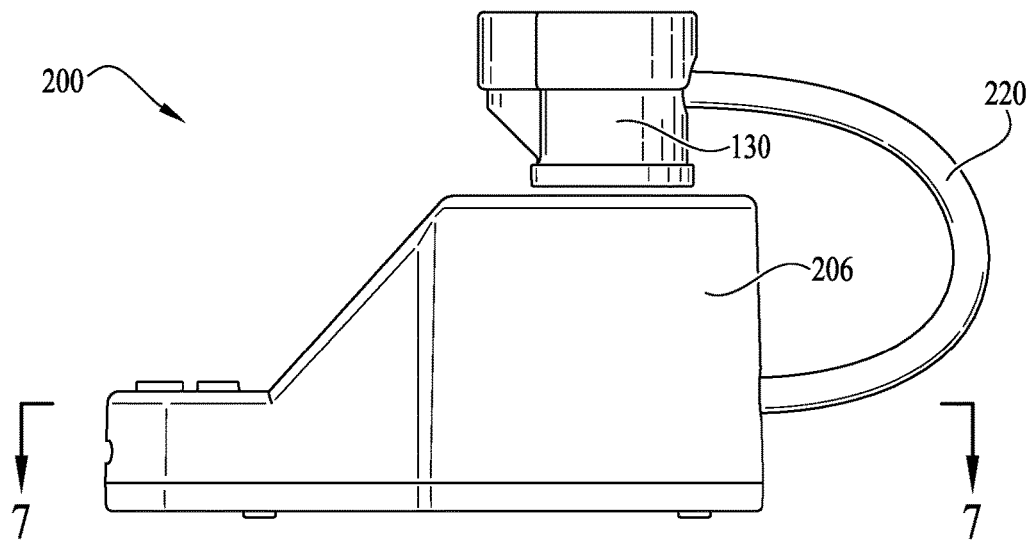
FIG. 6 is a right side elevation view of the device of FIG. 1.
Figure 7:
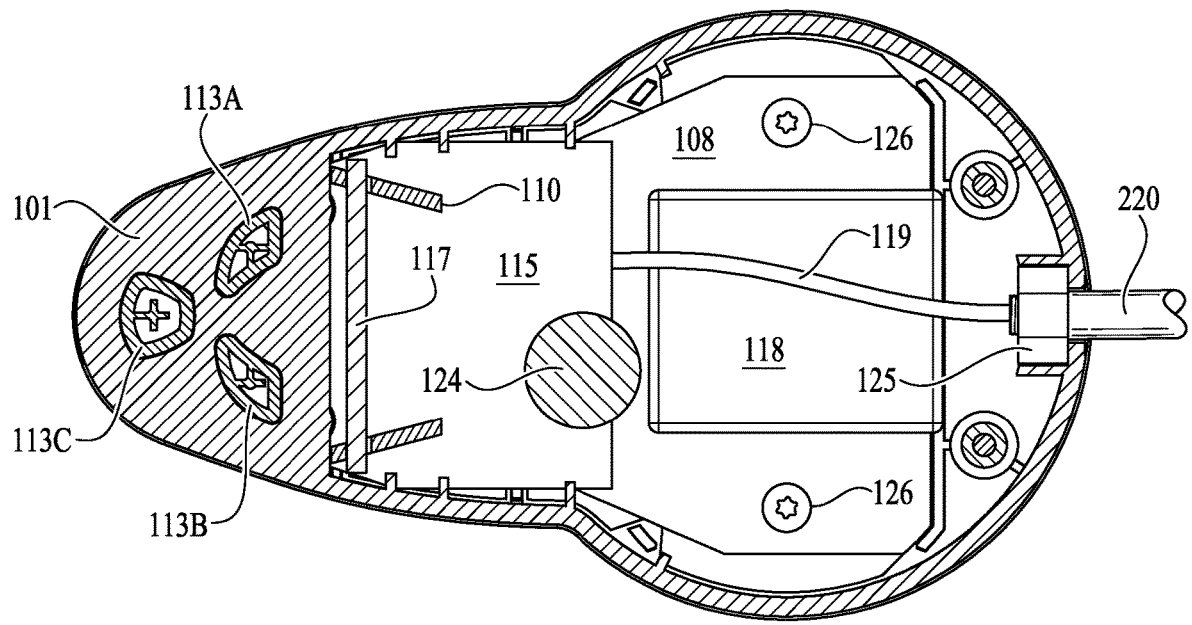
FIG. 7 is a sectional view of the device of FIG. 1, taken along line 7-7 of FIG. 6.

It is desirable that the temperature sensor 121 is proximate to a heated target material 207. For this purpose, the device 200 has an extension 220 that is at least 1.5 inches long and extends from the housing 206, where the extension 220 has a proximal section 222 at the housing 206 and an opposed distal section 224, wherein the distal section 224 is movable relative to the housing 206. The temperature sensor 121 is at the distal section 224 of the extension 220 for sensing the temperature of the target material 207 and providing an output related to the temperature of the target material 207. This is best seen in FIGS. 5 and 8. The extension 220 can be from about 3 to about 12 inches long so that the temperature sensor 121 is at least 1.5 inches and up to 12 inches, and preferably 7 inches, from the housing 206. Preferably, the extension 220 is a flexible tube 111.

A sensor assembly 129, which is best seen in FIG. 8, includes the sensor 121, a sensor tube 122 and a collar 123, with components held in place with locking nuts 125. The sensor assembly 129 also includes a sensor barrel 130 formed of wall components 102 and 103, a barrel cap top portion 104 and a barrel cap bottom portion 105. Wall components 102 and 103 form two halves of the sensor barrel 130 that when coupled together, holding the remaining components of the sensor assembly 129, discussed in more detail below, therein. The sensor assembly 129 is located at the distal section 224 of the extension 220.

Output from the temperature sensor 121 is related to the temperature of the target material 207, and is transmitted to a sensor printed circuit board 116 via a cable 119 for transmission to the main sensor board 115.

The housing 206 includes a thermal insulating insert 106 and the sensor assembly 129 further includes a cover 107, wherein both the insulating insert 106 and the cover 107 are preferably made of silicone. This is for protecting the sensor 121 from heat from the target material 207. The cover 107 is removable and remains on the sensor assembly 129 (gripping an exterior surface of the wall components 102, 103) via friction.

Preferably there is a light source such as a light emitting diode 120 as part of the sensor assembly 129. This can be used for aiming the sensor 121 at the target material 207 to be sure to get an accurate reading of the temperature of the target material 207.

Preferably the thermal insulating cover 107 has openings 128 for both the temperature sensor 121 and the light source 120 so they are not covered by the insulating material 107.

The housing 206 and other components can be formed of a plastic material such as ABS or nylon. Silicone can be used as the insulating material. Also, silicone can be used as a cushion for the recess 202. Recess 202 is configured to hold the banger cap 204 when the banger cap 204 is not in use. Silicone is desirable in recess 202 because the banger cap 204 can get hot and sticky during use. Accordingly, the silicone lined recess 202 provides a resting place for the banger cap 204 when not in use that can handle both the heat and the stickiness of the used banger cap 204.

FIG. 9 shows a flow chart for programming the device 200 utilizing the user buttons 113. The user buttons 113 are used to first power on the device 200, after which the main display screen 117 is shown. The user can then use the buttons 113 to set a target temperature and set an alert, such as a sound alert or a light alert or both so a user knows when the target temperature has been achieved. The alert indicates that heating the target material 207 should stop. The user then selects the banger type, completing the set-up and start-up of the device 200.

The user then lines up the sensor 121 with the banger 205. As noted above, the sensor assembly 129 includes an LED. When the LED is on, it provides a guiding beam of light. The beam should align with the edge of the banger 205 so that the sensor 121 is centered under the hanger 205.

The main circuit board 115 converts the output of the temperature sensor 121 to the display temperature.

The device 200 can be provided with memory such as ram, rom, and flash memory. The memory can be used for tracking the number of times the device 200 has sensed the target temperature. Memory can also be used for storing how much time it takes to reach the target temperature.

A feature of the present invention is an ability to adjust the output for the different type of container being used. As referred to in FIG. 9 there is an option "select banger type". For example, typical containers for the target material can be made of quartz or opaque quartz. The infrared transmissivity of these two types of materials is different, and thus by using a user key referred to as a selector key, the type of material holding the target material 207 can be inputted into the main circuit board 115 for adjusting the display temperature based on the infrared transmissivity of the container material.

Referring now to FIGS. 10A-10M, there are shown circuit diagrams for the circuits used in the device 200.

FIG. 10A shows a circuit for power management.

FIG. 10B shows a circuit for a VCC power supply.

FIGS. 10C and 10D show circuits for a sensor and peripheral compensation circuit.

FIG. 10E shows a circuit for the MCU.

FIG. 10F shows a circuit for communication isolation resistance.

FIG. 10G shows the circuit for an MCU program burning interface.

FIG. 10H shows a circuit for a display driver chip.

FIG. 10I shows a circuit for a flash memory chip.

FIG. 10J shows a circuit for the three switches on the control ports.

FIG. 10K shows a circuit for the display module.

FIG. 10L shows a circuit for low voltage detection.

FIG. 10M shows a circuit for the display driver chip program programming interface.

The purpose of the circuits shown in FIGS. 10A-10M and the functions they perform are the following:
1. Receive input signals from the temperature sensor 121;
2. Convert the input signal from the temperature sensor 121 to a temperature for display on the display 117 of the housing 206;
3. Accept user input to set the display for Centigrade or Fahrenheit;
4. Turn the light (LED) on and off based on current temperature and target temperature;
5. Receive user input to adjust the conversion of function 2 based on the type of container for the target material 207;
6. Receive user input to set a target temperature; and
7. Turn on notification to the user such as sound or light or both to notify the user that the target material 207 is at the target temperature.

Use of the device 200 with a standard vaporizing rig 300 is shown in FIG. 11. The vaporizing rig 300 has a mouthpiece 302 and a container (banger) 205 having an open top 208. In use, a target material 207 that generates a vapor when heated is placed into the container (banger) 205. The banger 205 can be translucent or transparent. The target material 207 is heated to a temperature that generates a vapor, such as with a butane torch. The temperature of the target material 207 is detected by the device 200, and this is effected by moving the extension 220 relative to the housing 206 so the temperature sensor 121 is at a location proximate to the container 205, such as 2 inches or less from the target material 207. Thus the height and angle of the sensor 121 relative to the target material 207 can be changed. Once the desired temperature is reached, the user places the banger cap 204 onto/into the open top 208 of the banger 205, and then the user inhales the vapor through the mouthpiece 302.

Although the invention has been described with regard to preferred versions, other versions are possible. For example, the device 200 can be provided with a Bluetooth connection for use with a smart phone. The sensor 121 can communicate wirelessly rather than be wired. Multiple temperature sensors 121 can be provided to determine the temperature of multiple target materials 207. The extension 220 can be removable such as with fasteners (such as screws) so a first extension can be changed out for a second extension of a different length or for a different temperature sensor that is effective in a different temperature range.

The present invention has many advantages, including the following:

The device 200 is hands free, meaning, the housing base 100 is placed on a surface, such as a table top or desk top, and the temperature sensor 121 can then be moved, via extension 224, independently of housing 206, into close proximity to the heated container 205 to be sensed. This configuration is ideal because the user does not have to hold the device 200/sensor 121 steady and in place while the device 200 takes it temperature readings. If the device 200 were hand-held, the device 200 and sensor 121 would be unstable and subject to undesirable movement caused by the users hands. Additionally, both of the user's hands are free for dabbing, which is highly desirable.

Along the same lines, the flexible extension 224 allows the sensor 121 to be in the position under the banger/container 205, and still have the device 200 facing the user so the user can view the display 117.

Device 200 has recess 202 for holding a banger cap 204. This is desirable because after use, banger cap 204 is hot and sticky and due to its shape, cannot hold itself upright. Accordingly, recess 202 provides a safe and secure place to hold a hot and sticky banger cap 204 while the banger cap 204 is not in use.

The device 200 also has the ability to adjust the output for the different type of container 205 being used. This is ideal because many users have different types of containers 205 made from different materials and the device 200 can adapt accordingly.

The device 200 can be programmed or adapted to measure the time it takes for the target material 207 to be heated to reaching the desired temperature and track that over time and when certain parameters are met, the user can be alerted to replace the container 205. This is because the more times a container 205 is heated, the container 205 loses the ability to transmit heat to the target material.

The device 200 can also track how many times a target material 207 (such as a dab) has been heated and the effectiveness of different bangers over time. This would be valuable to an end user to see which brand of banger works best and to also make adjustments to the way they prepare the banger prior to dabbing.

While particular forms of the invention have been illustrated and described, it will also be apparent to those skilled in the art that various modifications can be made without departing from the spirit and scope of the invention.

The steps disclosed for the methods of use, for example, are not intended to be limiting nor are they intended to indicate that each step is necessarily essential to the method, but instead are exemplary steps only. Therefore, the scope of the appended claims should not be limited to the description of preferred embodiments contained in this disclosure.

What is claimed is:

1. A temperature sensing device comprising:
   a) a housing with a display;
   b) a flexible arm extending from the housing, the arm having a proximal section at the housing and an opposed distal section, the distal section being movable relative to the housing;
   c) an infrared temperature sensor at the distal section of the arm for sensing the temperature of a target material and providing an output related to the temperature of the target material, wherein the target material is cannabis and the sensor is effective with the target material being cannabis;
   d) a connector disposed within the arm for transmitting the output from the temperature sensor to the display;
   e) a silicone thermal insulator coupled to the distal section of the arm; and
   f) an alarm configured to indicate when the temperature sensed by the temperature sensor is a target temperature of the target material or outside a designated temperature range.

2. The device of claim 1, wherein the alarm comprises both a visual indicator and an audio indicator.

3. The device of claim 1, wherein the housing comprises a base and a plurality of feet are coupled to the base for supporting the device on a surface.

4. The device of claim 1, wherein the housing further comprises a plurality of keys configured for controlling the alarm and setting the designated temperature range.

5. The device of claim 1, wherein the device further comprises a light at the distal section of the arm.

6. The device of claim 1, comprising a hole in the thermal insulator so the temperature sensor is not covered by the insulator.

7. The device of claim 1, wherein the display shows the temperature sensed by the temperature sensor.

8. The device of claim 1, wherein the housing has an input key for setting the target temperature of the target material and the alarm generates an alert when the target temperature is sensed by the temperature sensor.

9. A temperature sensing device comprising:
   a) a housing with a display;
   b) a flexible arm extending from the housing, the arm having a proximal section at the housing and an opposed distal section, the distal section being movable relative to the housing;
   c) an infrared temperature sensor at the distal section of the arm for sensing the temperature of a target material and providing an output related to the temperature of the target material, wherein the target material is cannabis and the sensor is effective with the target material being cannabis; and
   d) a connector disposed within the arm for transmitting the output from the temperature sensor to the display.

10. The device of claim 9, wherein the device further comprises a thermal insulator coupled to the distal section of the arm.

11. The device of claim 10, wherein the thermal insulator is made of silicone.

12. The device of claim 9, comprising a hole in the thermal insulator so the temperature sensor is not covered by the insulator.

13. The device of claim 9, wherein the device further comprises an alarm configured to indicate when the temperature sensed by the temperature sensor is a target temperature or outside a designated temperature range.

14. The device of claim 13, wherein the alarm comprises both a visual indicator and an audio indicator.

15. The device of claim 9, wherein the housing comprises a base and a plurality of feet are coupled to the base for supporting the device on a surface.

16. The device of claim 9, wherein the housing further comprises a plurality of keys configured for controlling the alarm and setting a designated temperature range.

17. The device of claim 9, wherein the device further comprises a light at the distal section of the arm.

18. The device of claim 9, wherein the display shows the temperature sensed by the temperature sensor.

19. The device of claim 9, wherein the housing has an input key for setting a target temperature of the target material and an alarm for generating an alert when the target temperature is sensed by the temperature sensor.

20. A temperature sensing device comprising:
   a) a housing with a display;
   b) a flexible arm extending from the housing, the arm having a proximal section at the housing and an opposed distal section, the distal section being movable relative to the housing;
   c) an infrared temperature sensor at the distal section of the arm for providing an output related to the temperature of a target, wherein the target is cannabis and the arm can be moved so that the sensor can be proximate to the target, wherein the sensor is effective with the target material being cannabis;
   d) a connector disposed within the arm for transmitting the output from the temperature sensor to the housing; and
   e) a thermal insulator coupled to the distal section of the arm for protecting the temperature sensor from heat from the target.

21. The device of claim 20, wherein the device further comprises an alarm configured to indicate when the temperature of the target is a target temperature or outside a designated temperature range, and the alarm comprises both a visual indicator and an audio indicator.

22. The device of claim 20, wherein the housing comprises a base and a plurality of feet are coupled to the base for supporting the device on a surface.

23. The device of claim 21, wherein the housing further comprises a plurality of keys configured for controlling the alarm and setting the designated temperature range.

24. The device of claim 20, wherein the device further comprises a light at the distal section of the arm.

25. The device of claim 20, comprising a hole in the thermal insulator so the temperature sensor is not covered by the insulator.

26. The device of claim 20, wherein the housing has an input key for setting the target temperature of the target and an alarm generates an alert when the target temperature is sensed by the temperature sensor.

27. A temperature sensing device comprising:
a) a housing with a display;
b) a flexible arm extending from the housing, the arm having a proximal section at the housing and an opposed distal section, the distal section being movable relative to the housing;
c) an infrared temperature sensor at the distal section of the arm for sensing the temperature of a target material and providing an output related to the temperature of the target material, wherein the target material is cannabis and the sensor is effective with the target material being cannabis;
d) a connector disposed within the arm for transmitting the output from the temperature sensor to the display;
e) a silicone thermal insulator coupled to the distal section of the arm;
f) an alarm configured to indicate when the temperature sensed by the temperature sensor is a target temperature of the target material or outside a designated temperature range;
g) a plurality of keys configured for controlling the alarm and setting the designated temperature range; and
h) a light at the distal section of the arm.

* * * * *